E. L. WATSON.
FLY POISONING DEVICE.
APPLICATION FILED APR. 19, 1919.
1,328,936.
Patented Jan. 27, 1920.
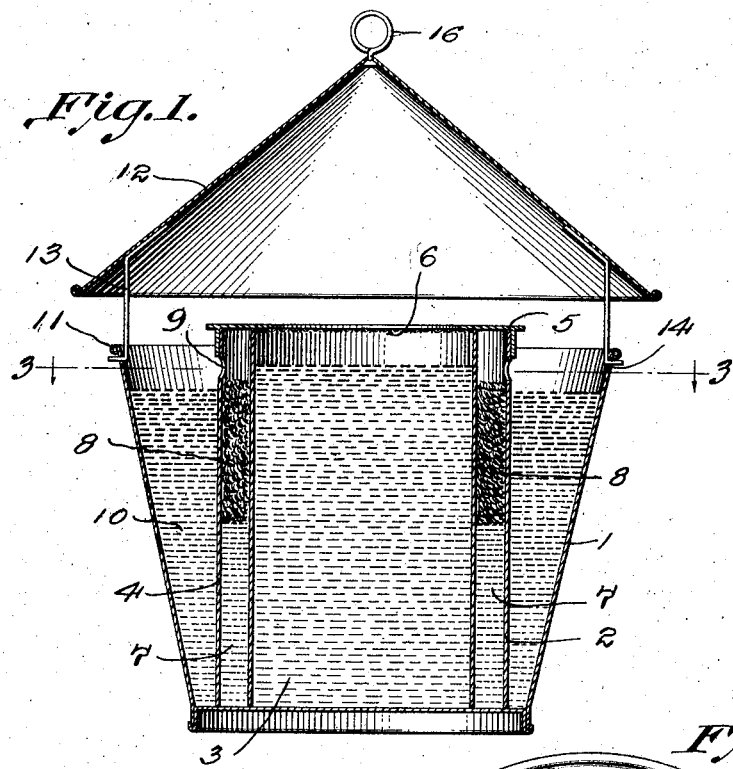
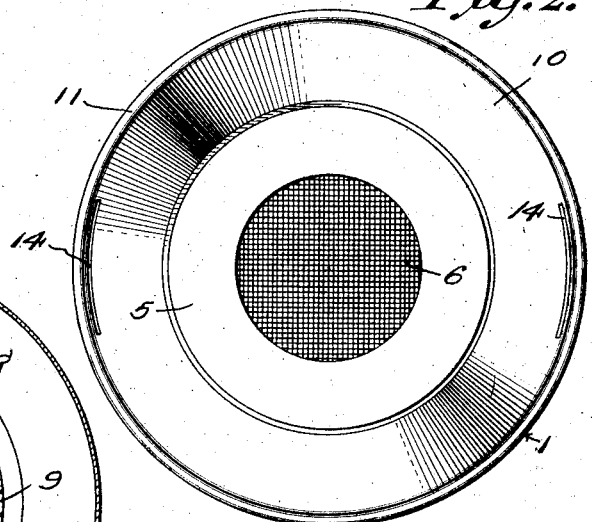
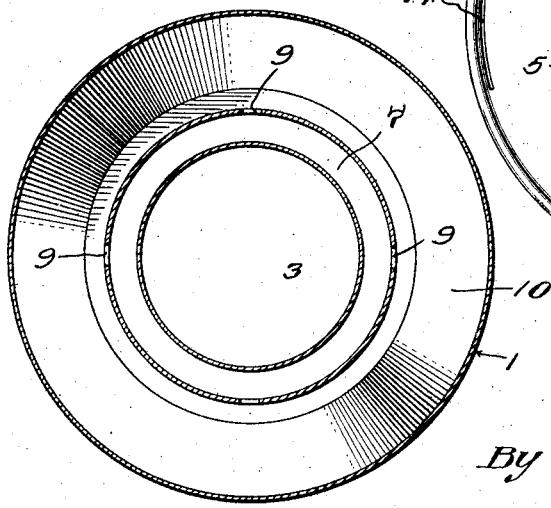
Inventor
Edward L. Watson,
By
Attorney

UNITED STATES PATENT OFFICE.

EDWARD L. WATSON, OF DALLAS, SOUTH DAKOTA.

FLY-POISONING DEVICE.

1,328,936.
Specification of Letters Patent. Patented Jan. 27, 1920.

Application filed April 19, 1919. Serial No. 291,283.

*To all whom it may concern:*

Be it known that I, EDWARD L. WATSON, a citizen of the United States, residing at Dallas, in the county of Gregory and State of South Dakota, have invented a new and useful Fly-Poisoning Device, of which the following is a specification.

The object of invention is to provide an improved device having novel means for attracting flies by lure, the effectiveness of which has not been lessened by the addition of poison to the lure, which is inaccessible to them and having one or more other compartments containing accessible poisoned bait which will destroy the flies that feed upon it. It is a special object of my invention to provide a device that can be made at a comparatively small cost; which has novel means for protecting the bait from the rain; and which may be used with success in attracting and destroying the common house fly and other flies, including the blow fly when baited with animal matter.

I attain the objects of my invention by the device disclosed in the accompanying drawings, in which—

Figure 1 is a vertical section of the device; and

Fig. 2 is a top plan with the roof removed; and

Fig. 3 is a section on line 3—3 on Fig. 1.

Referring to the accompanying drawings, I provide a suitable container 1, preferably of inverted concavo-convex shape. Mounted in container 1 I provide a cylindrical wall 2 extending to approximately the same height as the top of the container 1 and forming the inner compartment 3, in which is contained suitable lure to attract the flies. Also mounted on the base of container 1 I provide a second cylindrical wall concentric with, and spaced from and encircling the wall 2 to provide an annular chamber 7 between walls 2 and 4. This chamber 7 contains wicking 8 serving as a nest for the blow fly to lay its eggs. Walls 2 and 4 are of equal height. I provide an annular cover 5 which closes the compartment 7, prevents the passage of flies from the outer annular to the innermost compartment, and also darkens this compartment and thus makes it attractive to the blow fly. Cover 5 is provided with a central screening 6 which extends over the lure compartment 3 formed by wall 2, and allows the odor from the lure to escape and attract flies. Suitable openings 9 in the upper portion of wall 4 provide a passage-way for the blow flies from the outer poison chamber 10 to the compartment 7. Chamber 7 contains suitable bait mingled with poison and the flies which are attracted by the lure in compartment 3 do not reach that compartment, but instead feed on the poison bait in compartment 10 and the dead flies are collected there. The device is provided with a conical roof 12, the outer rim of which projects beyond the rim 11 of container 1 and protects the bait and lure from dilution by rain, retards evaporation by the sun, and permits of the device being hung out of doors. I provide a loop or ring 16 attached to the apex of roof 12 by which the device may be conveniently suspended. Roof 12 is provided with suitable resilient arms 13 having their ends bent outwardly to engage in corresponding slots 14 just beneath the rim 11 of container 1, as illustrated in the accompanying drawings.

While any suitable lure may be put in compartment 3 to attract the flies I have discovered that the most efficient lure consists of red blood corpuscles to which, may be added .1 to .5 per cent. of borax as a preservative. The preservative may be entirely omitted if it is decided to accentuate the attractiveness of the lure to the flies. Wicking or waste bait in the annular compartment 7 provides a place for the blow flies to deposit their eggs and the destruction of both flies and eggs is thus effected. In this compartment is also a quantity of bait to which a small quantity of water has been added to insure decomposition. In the outer compartment 15 is a quantity of liquid bait mingled with a suitable quantity of poison such as cobalt and arsenic. The common house flies will gather in this compartment and feed on the poisoned bait.

It is within the contemplation of my invention to omit wall 4 and provide simply two compartments in the container, the central one to contain the lure or unpreserved bait, while the next compartment contains wicking and a suitable poison to kill the flies. I am aware that many devices designed to attract flies have heretofore been devised, but my invention is an improvement in that the flies are poisoned and compartments are arranged in which a liquid bait and lure can be placed, and in that the device is effective in killing the blow fly and its larvæ as well as the common house fly.

I have discovered that the most effective lure consists of the red corpuscles of the blood of hogs, the white serum being separated and removed in any suitable manner. Poison may be added but this is usually not desired as it tends to prevent decomposition and thus lessen the effectiveness of the substance in attracting flies when the invention is used in competition with other substance, the odor of which tends to attract flies.

The device is so constructed that the flies can not reach the lure but only the poisoned bait in a separate compartment from the lure and they are promptly killed and prevented from escaping and disseminating germs from the unpoisoned and unpreserved lure. In this respect the device differs in an important manner from prior devices which have the lure exposed and accessible to the flies and which allow the flies to escape again after tracking over the lure.

What I claim is:

1. In a fly poisoning device, the combination of a container having a plurality of compartments arranged one within the other, the inner compartment containing lure to attract the flies and having a screened cover preventing their entrance to said compartment, an outer compartment accessible to the flies and containing poisoned bait, a roof releasably attached to the container and having its outer rim projecting substantially beyond the rim of the container to prevent the entrance of rain which would dilute the bait, and means for suspending said roof, substantially as and for the purposes described.

2. In a device of the class described, the combination of a container having an innermost compartment containing lure for flies, a surrounding compartment containing bait saturated wicking to attract blow flies seeking a nest, a cover engaging over the last mentioned compartment to darken same and to prevent flies from passing to the innermost compartment, an outermost compartment containing liquid poisoned bait where flies other than blow flies collect and feed, and a roof protecting the contents of the device from rain and having means for suspending same, said cover having arms detachably connecting same to the container, substantially as and for the purposes described.

EDWARD L. WATSON.